Feb. 27, 1923.
R. M. GRUSS
SHOCK ABSORBER
Filed Feb. 6, 1922
1,446,793
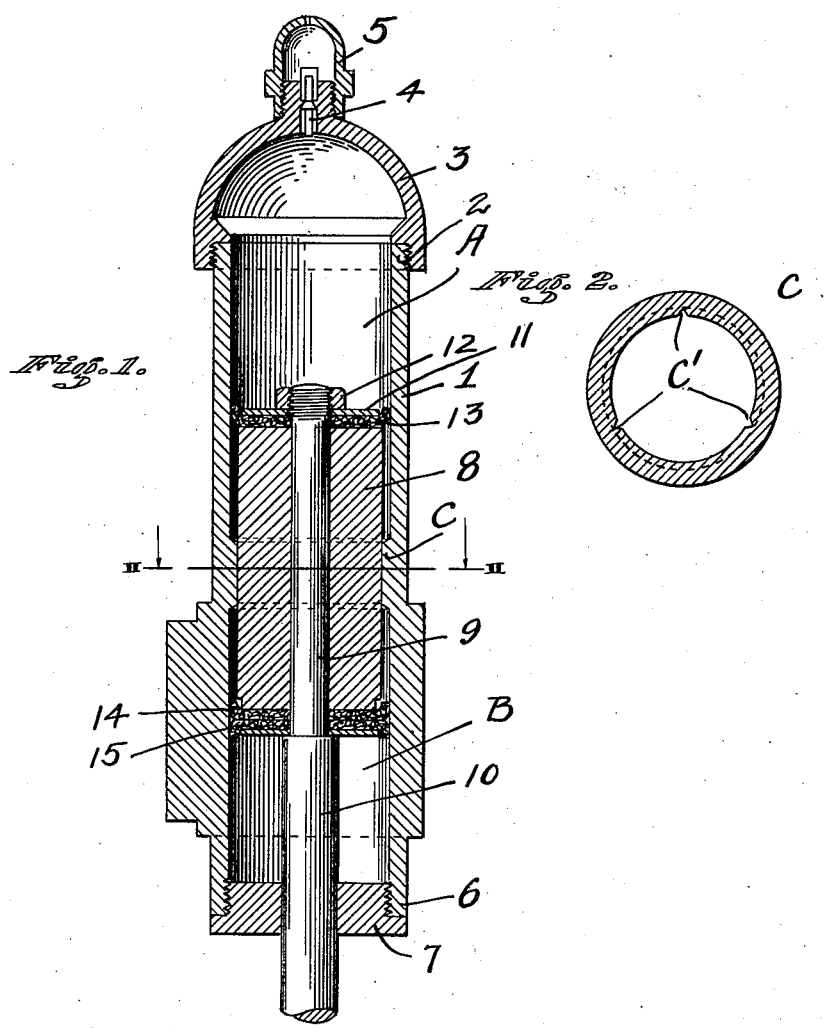
INVENTOR.
ROLAND M. GRUSS
BY
ATTORNEYS.

Patented Feb. 27, 1923.

1,446,793

UNITED STATES PATENT OFFICE.

ROLAND M. GRUSS, OF SAN FRANCISCO, CALIFORNIA.

SHOCK ABSORBER.

Application filed February 6, 1922. Serial No. 534,517.

*To all whom it may concern:*

Be it known that I, ROLAND M. GRUSS, a citizen of the United States, and a resident of San Francisco, county of San Francisco, and State of California, have invented a new and useful Shock Absorber, of which the following is a specification.

My invention relates in general to shock absorbers and has reference more particularly to a device of this character adapted to be applied to motor vehicles or the like for use in combination with the spring suspension thereof, for absorbing and equalizing the shocks incident to the travel of the vehicle over rough road surfaces and the like in order to make the vehicle ride easy.

The invention possesses other objects and features which will appear as the description now proceeds with reference to the accompanying drawing, in which Figure 1 is a vertical section of a shock absorber being in accordance with my invention, and Figure 2 is a cross section on the line 2—2 of Figure 1.

Referring now to the drawing in detail, (1) represents a cylinder having screw threads at its upper end (2) adapted to receive the dome-shaped cap (3) so that the cap may be threaded thereon for closing the top of the cylinder, with the air intake valve (4) arranged in the cap covered by a screw threaded protector (5). The purpose of the valve will presently appear. The bottom (6) of the cylinder is threaded internally to receive the plug (7) for closing the bottom of the cylinder. Mounted for reciprocation in the cylinder is an elongated and preferably solid piston (8) which is mounted on the reduced elongated part (9) of the piston rod (10) with the piston rod extending through the center opening in the plug (7). The piston (8) is introduced into the cylinder or removed therefrom through the opening left by taking out the plug (7). The diameter of the cylinder (1) is greater than that of the piston (8) so as to leave a space between the piston and the cylinder. Carried by the top of the piston and clamped upon the same by the disc (11), which is screwed down by the nut (12) on the end of the reduced part (9) of the rod (10), is a cup washer or the like (13), the same having a diameter larger than that of the cylinder so that its ends may be turned up to effect a seal to prevent oil, which is supported above the piston in the upper chamber (A) of the cylinder, from normally leaking into the space between the piston and the cylinder. The bottom of the piston carries a pair of cup washers (14) and (15), the top one, namely (14), having its ends turned upwardly in the same direction as the cup (13), whereas the bottom washer (15) has its ends turned downwardly.

The piston virtually divides the cylinder into an upper cushioning chamber (A) and a lower cushioning chamber (B). Air is maintained under substantially atmospheric pressure in the chamber (B), whereas a head of air is maintained on top of the oil in the upper cushioning chamber (A), the air being introduced through the valve (4) by a pressure pump or the like.

As above stated, the diameter of the cylinder (1) is greater than that of the piston (8). However, I propose, for reasons which will follow, to arrange the cylinder (1) with the diameter for a short portion of its length of substantially that of the piston (8) with the piston and the cylinder at this point having a tight fit. To accomplish this increase in diameter at this point I propose to cast an internal annular ring on the inside of the cylinder as an integral part of the cylinder, the ring being represented as at (C). By the use of this ring I can divide the space between the piston and the cylinder into upper and lower channel spaces so that when the piston is on an up stroke in the cylinder any oil which leaks by the cup washer (13) will occupy the space between the piston and the cylinder above the ring (C), and when on its pison recedes in the cylinder, or rather on its down stroke, the oil thus occupying the channel space above the ring (C) will be forced upwardly by compression and directed back into the supply above the piston. Should any oil leak by the ring (C) into the lower channel space below the ring, it will be compressed and forced back into the channel space above the ring upon an up stroke of the piston. This enables me to prevent any oil from collecting into the lower cushioning chamber (B) of the cylinder, which is a highly desirable feature for obvious reasons.

In some instances I may desire to arrange means to enable the oil to be forced from the channel space below the ring (C) into the channel space above the ring (C) more readily than would ordinarily be realized by the tight fit between the piston and the ring. In this connection attention is directed to Figure 2 in which I have shown the ring provided with a plurality of longitudinal grooves (C') arranged in spaced relation around the ring so as to provide a restricted passage between the channel spaces above and below the ring.

I claim:

1. A shock absorber including a closed cylinder, an elongated piston mounted for reciprocation within the cylinder and dividing the cylinder into upper and lower chambers, means on top of the piston for maintaining a quantity of oil in the upper chamber of the cylinder, and a head of air above said oil, the diameter of the cylinder being greater than that of the piston for the greater part of the cylinder length but of substantially the same diameter as that of the piston for a part of its length to leave upper and lower annular channeled spaces between the piston and the cylinder with the reciprocation of the piston adapted to alternately increase and decrease the area of the spaces.

2. A shock absorber including a closed cylinder, an elongated piston mounted for reciprocation within the cylinder and dividing the cylinder into upper and lower cushioning chambers, means on top of the piston for supporting a quantity of oil in said upper chamber with a head of air above said oil, means on the bottom of the piston for completing the seal for the lower chamber; said cylinder having a diameter greater than that of the piston, and an internal ring on the cylinder adapted to divide the space between the piston and the cylinder into upper and lower annular channel spaces and with the reciprocation of the piston alternately changing the area of said spaces.

3. A shock absorber as set forth in claim 2 and in which the said internal ring is formed with longitudinal grooves at spaced distances apart, substantially as and for the purpose described.

ROLAND M. GRUSS.